United States Patent
Tahernezhaadi (10) Patent No.: US 6,836,547 B2
(45) Date of Patent: Dec. 28, 2004

(54) PROTECTING AN ECHO CANCELLER AGAINST RANDOM TRANSITIONS IN ECHO PATHS

(75) Inventor: Mansour Tahernezhaadi, Naperville, IL (US)

(73) Assignee: Motorol, Inc., Schaumburg, IL (US)

( * ) Notice: Subject to any disclaimer, the term of this patent is extended or adjusted under 35 U.S.C. 154(b) by 195 days.

(21) Appl. No.: 10/027,158

(22) Filed: Dec. 20, 2001

(65) Prior Publication Data

US 2003/0118178 A1 Jun. 26, 2003

(51) Int. Cl.[7] .............................................. H04M 9/08
(52) U.S. Cl. ..................... 379/406.01; 379/406.02; 379/406.04; 379/406.05; 379/406.06; 379/406.08; 379/406.09
(58) Field of Search ...................... 379/406.01–406.16

(56) References Cited

U.S. PATENT DOCUMENTS

| | | | | |
|---|---|---|---|---|
| 4,947,425 A | * | 8/1990 | Grizmala et al. | 379/406.01 |
| 5,237,562 A | * | 8/1993 | Fujii et al. | 379/406.01 |
| 6,028,929 A | * | 2/2000 | Laberteaux | 379/406.01 |
| 6,125,179 A | * | 9/2000 | Wu | 379/406.01 |
| 6,167,133 A | * | 12/2000 | Caceres et al. | 379/406.01 |
| 6,185,300 B1 | * | 2/2001 | Romesburg | 379/406.01 |
| 6,507,653 B1 | * | 1/2003 | Romesburg | 379/406.05 |
| 6,516,063 B1 | * | 2/2003 | Farrell et al. | 379/406.08 |

* cited by examiner

*Primary Examiner*—Forester W. Isen
*Assistant Examiner*—Ramnandan Singh
(74) *Attorney, Agent, or Firm*—Marshall, Gerstein & Borun LLP (57) ABSTRACT

A method and apparatus is capable of detecting the presence of a non-linear echo path as well as transitions from non-linear echo path to linear echo path and vice versa. Additionally, when non-linear echo path is detected, the echo canceller (12) is configured to follow a prescribed logic routine that combats possible echo leak-through as a result of compromised cancellation due to non-linearity. This prescribed logic routine affords the echo canceller (12) protection against non-linear echo path by preserving an already converged state of the echo canceller (12) from possible divergence due to the occurrence of non-linearity in the echo path and thereby prevents echo leak-through that would occur due to divergence of the echo canceller (12).

20 Claims, 8 Drawing Sheets

PROTECTING AN ECHO CANCELLER AGAINST RANDOM TRANSITIONS IN ECHO PATHS

FIELD OF THE INVENTION

The present invention relates generally to communication systems, and more particularly, to a method and apparatus that is employed in an echo canceller to detect and protect against random transitions from linear to non-linear echo paths.

BACKGROUND OF THE INVENTION

Communication systems generally have opposing ends between which signals are transmitted. Two-wire connections, in particular, require mixing of a duplex telephone signal (i.e., transmit and receive) for communication between wire line subscribers through a central telephone office. In a telephone network, four-wire and two-wire segments are joined at opposite ends of the telephone network by hybrid circuits, which are often referred to as 4:2 hybrids. Impedance mismatch in a hybrid circuit causes a four-wire receive path signal to be reflected onto the four-wire send path. If there is enough delay in the network, this reflected signal presents itself as echo to the speaker who originated speech at a far-end of the network. Short delays experienced between local communicators (on the order of 1 to 20 milliseconds) typically do not present an impediment to the efficient exchange of spoken words. Longer delays, however, may result in syllables and even entire words being repeated as an echo and may render the communication channel unusable. Echo may also be acoustic in nature as a result of microphone and speaker coupling, such as in mobile handsets and hands-free units, for example. Acoustic echo greatly undermines voice quality if the mobile hands-free unit fails to compensate for the acoustic echo.

A solution to the echo problem has been to provide what are referred to as "echo cancellers" to prevent delayed or reflected far-end signals from interfering with a near-end listener by attempting to cancel any extraneous signals present on a channel. Specifically, echo cancellers cancel echo by producing synthetic echo for subsequent subtraction from the received echo signal (near-end talker). The echo canceller utilizes a synthetic echo generating system, also known as an adaptive filter, that processes an incoming voice signal, referred to as a reference speech signal $x(n)$, to estimate the echo that will be generated by those elements of the communication system that introduce echo. Generally, as long as the echo canceller is converged, the signal output from the echo canceller is relatively echo free.

In conventional echo cancellers, the adaptive filter utilizes algorithms to estimate the echo based on the assumption that the echo generating system has a linear dynamic characteristic. However, it has been observed by the applicants that an already converged echo canceller may experience divergence due to significant departure of the echo generating system from a linear dynamic to a non-linear dynamic. This departure may be transient or random in nature, wherein the echo generating system reverts back from a non-linear state to a linear state and vice versa. Consequently, the occurrence of this behavior leads to unsatisfactory performance for an echo canceller with a significant amount of uncancelled, annoying echo leaving the echo canceller.

DETAILED DESCRIPTION OF THE PREFERRED EMBODIMENTS

A method and apparatus is capable of detecting the presence of a non-linear echo path as well as transitions from non-linear echo path to linear echo path and vice versa. Additionally, when non-linear echo path is detected, the echo canceller is configured to follow a prescribed logic routine that combats possible echo leak-through as a result of compromised cancellation due to non-linearity. This prescribed logic routine affords the echo canceller protection against non-linear echo path by preserving an already converged state of the echo canceller from possible divergence due to the occurrence of non-linearity in the echo path and thereby prevents echo leak-through that would occur due to divergence of the echo canceller.

Figure 1:
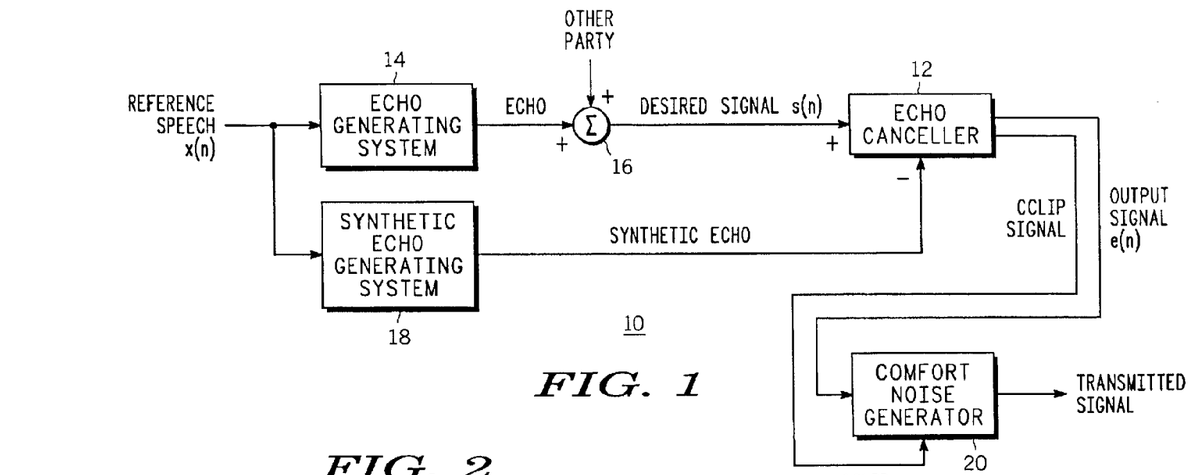
FIG. 1 is a block diagram of a communication system incorporating an echo canceller system.

FIG. 1 illustrates a portion of a communication system 10 employing echo cancellation to remove echo from a signal that is transmitted to a far-end communicator. The echo canceller 12 is shown receiving a desired signal $s(n)$ that includes of the sum of near-end speech or "other party" speech and any echo presented by what is termed the "echo generating system" 14, which represents any elements that may introduce echo such as a hybrid or acoustic echo. Summing junction 16 represents that the near-end speech and the echo presented by the echo generating system 14 are added together due to the inherent characteristics of the end path. As part of the echo cancellation system as a whole, a synthetic echo generating system, otherwise known as an adaptive filter, processes reference speech $x(n)$ received from a far-end of the communication system in order to estimate the echo that will be produced by the echo generating system 14. Preferably, the synthetic echo generating system 18 processes the reference speech signal $x(n)$ every 125 microseconds (i.e., 8,000 samples per second). The synthetic generating system may use a Least Means Square (LMS) algorithm wherein adaptive filter coefficients are generated to generate a synthetic echo signal that is essentially identical to the echo produced by the echo generating system 14. This signal is sent to the echo canceller 12 and subtracted from the desired signal $s(n)$ input to the echo canceller 12. The signal output from the echo canceller 12 is referred to as the error signal $e(n)$, which is, in turn, delivered to a comfort noise generator 20.

Because echo cancellers cannot ordinarily cancel all the unwanted echo signal on a channel, communication systems employing echo cancellation include a center clipping echo suppressor to suppress any residual echo on the channel that is not cancelled by the echo canceller. The center clipper is a level-activated switch used to completely remove any pure residual echo in response to the center clipper flag cclip being in an ON state. As shown in FIG. 1, the center clipper flag signal cclip is generated by the echo canceller 12 and is provided to the comfort noise generator 20 to control the on and off operation of the comfort noise generator 20. Some echo cancellers known in the art do not insert any comfort noise to replace the center clipping of the echo canceller, which results in a channel that suddenly sounds "dead" whenever the center clipping echo suppression is on. The comfort noise generator 20 may be provided to compensate for the effects of echo suppression by inserting noise of either a fixed spectral shape (white or pink) or an estimated spectral shape when the comfort noise generator 20 is active. The inserted "comfort noise" provides a constant and continuous background noise to avoid perceptible variations in the noise characteristics on the channel. The output of the comfort noise generator 20 is either the error signal e(n) output by the echo canceller 12 or introduced comfort noise when the center clipper flag cclip is in the ON state.

Figure 2:
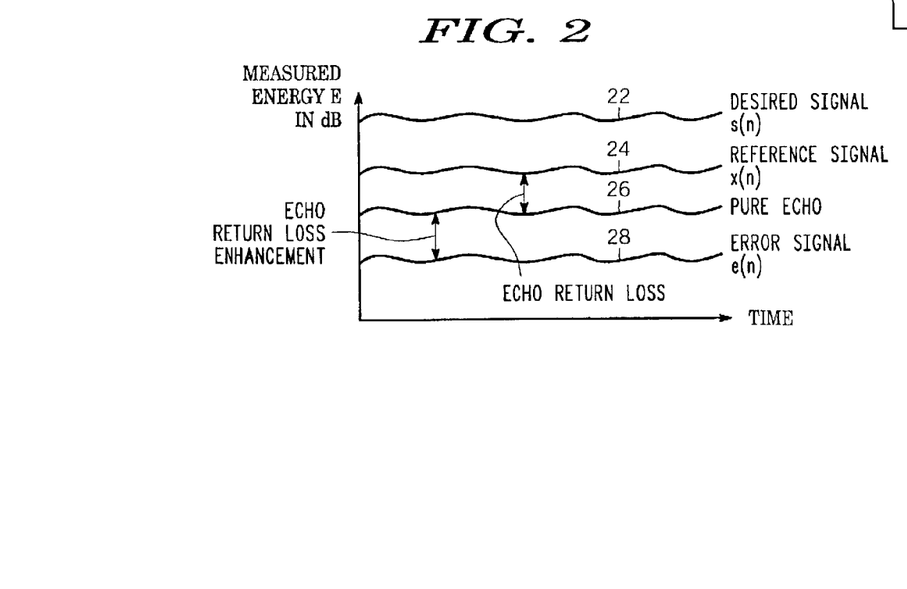
FIG. 2 is a graph illustrating the power levels of various signals present within the communication system illustrated in FIG. 1.

FIG. 2 is a graph illustrating the relative power levels of the different signals within the communication system 10 employing echo cancellation. The desired signal s(n) 22 typically includes near-end speech s(n) from the other party as well as the echo generated by the echo generating system 14. Accordingly, this signal has a relatively high energy level as measured by 10 log of the discrete energy amount taken over a 4 msec (e.g., every 32 samples, given a sampling rate of 8 kHz). At a lower energy level, the reference signal x(n) 24 is illustrated, which is the speech signal from the far-end communicator. Hereinafter this will be referred to as the average energy of the reference signal P_x and is computed every 4 msec using a rectangular window. The next signal shown is termed pure echo 26, which represents the echo energy when the near-end communicator (i.e., the other party) is not talking. The distance between the reference signal energy and the "pure echo" energy is referred to as the echo return loss (ERL). The ERL is the amount of loss between the reference signal energy 24 and the pure reflected echo that arises as a result of the echo generating system 14. Finally, the last signal shown in the graph of FIG. 2 is the error signal energy 28. The distance or difference between the pure echo signal 26 and the error signal energies 28 is called echo return loss enhancement (ERLE). The ERLE represents the amount of attenuation added to the echo as a result of adaptive digital subtraction. Hereinafter the energy of the error signal e(n) is referred to as the present error signal energy P_e_ec_pre.

In conventional echo cancellation systems, current practice is to continuously adapt with the adaptive filter except for periods when there is double talk at both the near and far ends (i.e., duplex operation). As mentioned previously, there are periods of divergence that are due to significant departure of the echo generating system from a linear dynamic to a nonlinear dynamic of an already converged echo canceller. The method and apparatus constructed according to the teachings of the present invention uncouples the mechanisms for adaptation and echo canceling so as to enable halting of the adaptive filter adaptation to avoid divergence of the echo canceller in the wake of a non-linear echo path and to resume adaptation when the echo path returns to a linear characteristic. In order to know when to halt or resume adaptation of the adaptive filter, the method and apparatus according to the teachings of the present invention must monitor and detect occurrences of non-linear echo path and also transitions from non-linear echo path to linear echo path and vice versa.

Additionally, consideration must be given to the cause of the non-linearity because the non-linearity could be due to the near-end communicator talking (e.g., such as in a double-talk situation, which the conventional echo canceller systems account for) or when the near-end communicator is absent and the system itself contains non-linearity that is confined within the communication system. This latter source of non-linearity is not contemplated by conventional echo canceling systems. A way to detect the non-linearity could be to simply monitor the ERLE and initiate center clipping when the level exceeds a predetermined threshold. However, non-linearity is not the only source of poor cancellation as poor cancellation could also result when the echo generating system evolves significantly (i.e. significant echo path change), but is still linear. Thus, further tests must be performed to distinguish between linearities and non-linearities and what type of non-linearity exists within the communication system. The method and apparatus constructed according to the teachings of the present invention is able to make these necessary determinations.

Figure 3:
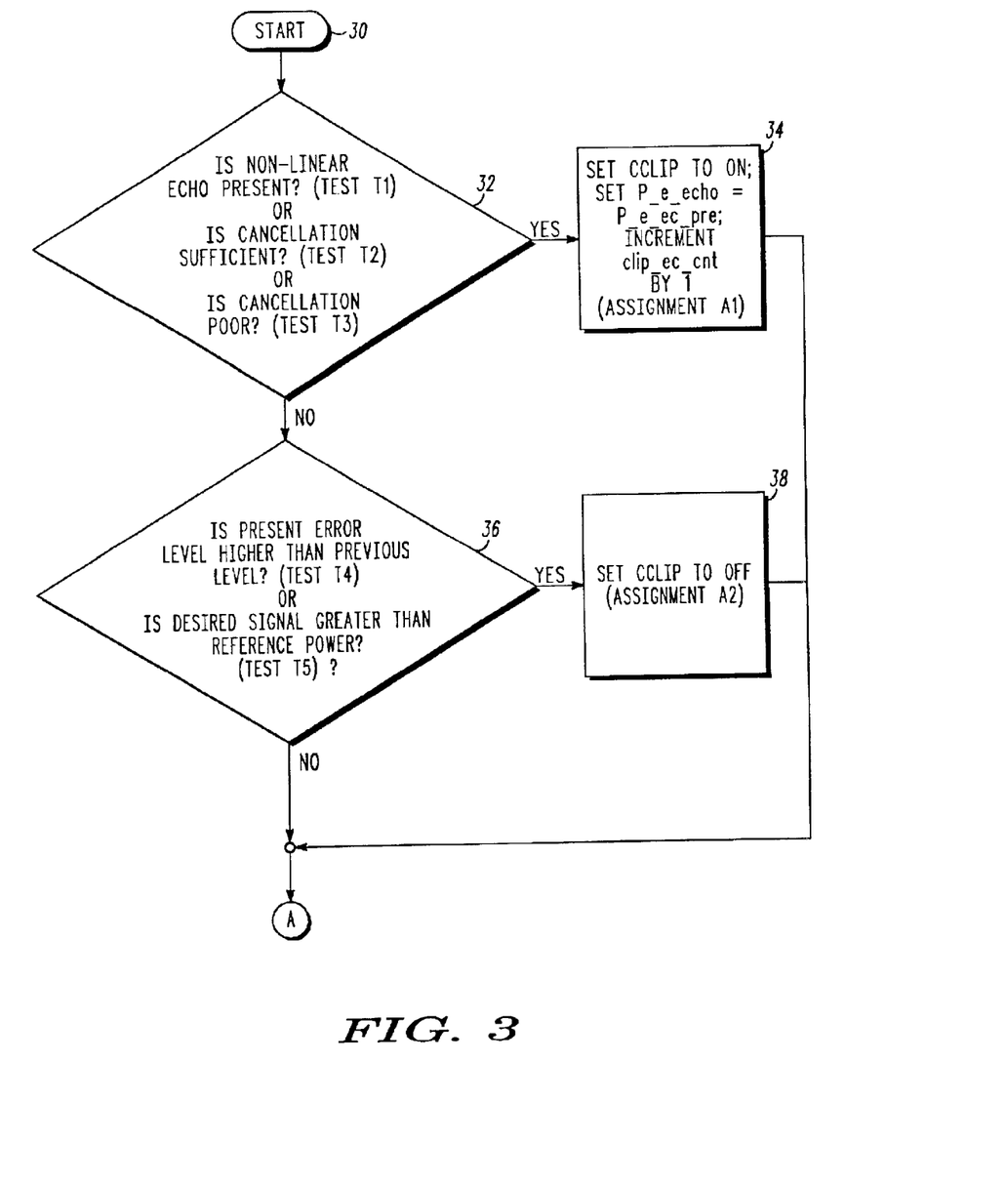
FIGS. 3–9 illustrate a process of echo cancellation that includes detection and protection against random transitions from linear to non-linear echo paths in accordance with the teachings of the present invention.

FIGS. 3–9 illustrate a flow chart depicting the particular steps that are employed by an echo cancellation system in accordance with the teachings of the present invention. As illustrated in FIG. 3, the method or algorithm starts at step 30 and proceeds to step 32 for polling of three distinct tests T1, T2, and T3. The first of these tests, test T1, checks for the presence of non-linear echo as indicated by a flag LIN_echo, which will be further described with respect to the NXT routine illustrated specifically in FIGS. 6–9. Test T1 particularly checks to see if the flag LIN_echo is in the OFF state indicating the presence of non-linear echo. Also, test T1 checks whether prior clipping has occurred for a specified duration by utilizing a counter clip_ec_cnt which is incremented each time the center clipper flag cclip is ON. Preferably, the duration is set at 12 milliseconds as measured by the counter having a value equal to or greater than three (3) computation periods of four (4) milliseconds each. Moreover, the present error signal energy P_e_ec_pre, which is an average energy computed every 4 milliseconds, is checked to see whether it is higher than a specified threshold amount (typically −38 dBmO). Alternatively, Test T1 may check if the reference energy P_x is strong (i.e., typically larger than −35 dBmO) and for previous clipping, indicated by an ON state of a flag clip_ec_past. The final consideration of test T1 is checking if minimal cancellation of a predetermined threshold which is typically the error power P_e_ec_pre is less than the desired power P_s by at least 2 dB. Essentially test T1, if true, is an acknowledgment that non-linear echo is present and there is not good cancellation as a result, because the system was consistently clipping previously, clipping should be continued. This continuation of clipping is shown by assignment A1 in step 34 of FIG. 3.

Alternatively, step 32 may also check if cancellation is sufficient in the presence of a strong desired signal s(n) such that clipping should be declared. Specifically, test T2 checks for sufficient cancellation by determining whether the error signal energy P_e_ec_pre is less than the energy of the desired signal P_s by a predetermined threshold (typically 8 dB). Alternatively, sufficient cancellation may be measured by the energy of the error signal P_e_ec_pre being less than the desired signal energy P_s by a predetermined threshold (typically 5 dB) provided that the desired signal energy P_s is above a first threshold (typically above −30 dBmO) indicating the desired signal energy is strong. The purpose of test T2 is to see if clipping should be declared given sufficient cancellation in the presence of a strong desired signal, even though the system may not have non-linear characteristics.

The final alternative in step 32 is test T3. Test T3 simply checks for poor cancellation by checking whether the error signal energy P_e_ec_pre is below the desired signal energy P_s by a predetermined threshold (typically 3 dB). If test T3 is true, flow proceeds to step 34 where the center clipper flag cclip is set to on to thereby clip the transmitted signal.

As may be seen in step 32, if one of the tests T1, T2 or T3 is true, then flow proceeds to step 34 where assignment A1 is effected. Specifically, the echo canceller 12 is instructed to set the center clipper flag cclip to an ON state. Additionally, a previous error average energy P_e_echo that corresponds to the energy state that occurred 4 milliseconds prior is set to the value of the present error average energy P_e_ec_pre. Finally, the assignment A1 performed in step 34 increments a present clipping counter clip_pre_cnt by 1. This counter is incremented each time the center clipper flag cclip is in an ON state during a 4 millisecond window. If the center clipper flag cclip is not ON during a computation period of 4 milliseconds, the counter is decremented. A predetermined characteristic of this counter is that it is set to saturate at a value of 10 in order to ensure fast reaction time.

If none of the conditions in step 32 are true, flow proceeds instead to step 36 wherein tests T4 and T5 are checked to see if either of these tests is true. Test T4 specifically checks if the present error level is higher than the previous error level by a significant amount. Hence, test T4 is checking for the trend of the error signal level toward increasingly higher levels. Specifically, the present error energy level is checked to determine whether it is higher than the previous error energy level by a predetermined threshold (e.g., 7 dB) and whether the previous error power was strong, such as higher than −38 dBmO. Test T4 also checks whether the reference power is below the error power by a threshold amount (e.g., 3 dB). If test T4 is true, this indicates that the present error signal level is significantly higher than the previous error signal level and that it is also exceeding the reference signal x(n). In such a case, clipping should not be performed and the echo canceller 12 is instructed to set the center clipper flag cclip to an OFF state as shown in step 38 (i.e., Assignment A2).

At step 36, an alternate condition is test T5. Test T5 checks to see whether the desired signal energy P_s is strong (e.g., greater than −37 dBmO). If this check can be answered in the affirmative, flow proceeds to step 38 for instruction of the echo canceller 12 to set the center clipper flag cclip to an OFF state.

Figure 4:
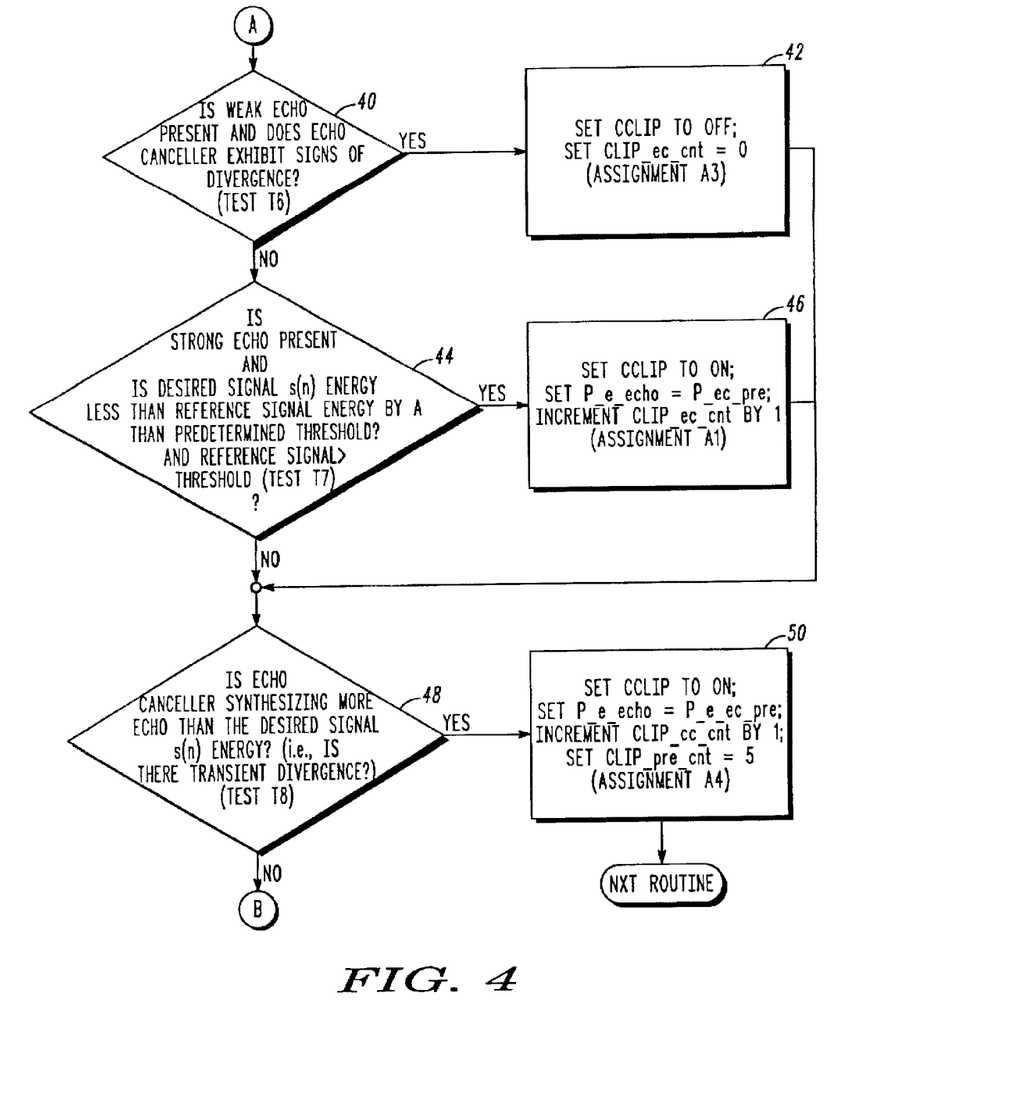

If neither test T4 or test T5 is true at step 36, flow proceeds to step 40 shown in FIG. 4. Additionally, it is noted that from both steps 34 and 38, flow proceeds directly to step 40.

In step 40 shown in FIG. 4, test T6 is performed to check for the presence of weak echo and if the echo canceller 12 is exhibiting any signs of divergence. Specifically, test T6 checks for the presence of weak echo by determining if the square of the peak adaptive filter coefficient magnitude (peak ADF) is less than a predetermined threshold (typically −12 dBmO). Additionally, test T6 checks for signs of divergence by determining whether the error energy P_e_ec_pre is above the desired signal energy P_s by a predetermined threshold (typically 5 dB). Furthermore, test T6 checks if the desired signal energy P_s is greater than the reference signal energy P_x by the peak ADF plus a predetermined threshold (typically 6 dB). If test T6 is true, flow proceeds to step 42 where the center clipper flag cclip is set to the OFF state. Also, the counter clip_ec_cnt is set to zero. Step 42 is also referred to as assignment A3. After execution of step 42, flow proceeds directly to step 48 to perform test T8. Otherwise at step 40, flow proceeds to step 44 where test T7 is performed.

Test T7 checks for the presence of strong echo and whether the reference signal s(n) energy exceeds a predetermined threshold and whether the desired signal energy P_s is below the reference signal energy P_x plus a predetermined amount (typically 5 dB). If test T7 is answered in the affirmative, this indicates that there is a presence of strong echo. If this is the case, the echo canceller 12 is instructed to declare clipping and set the center clipper flag cclip to the ON state as indicated by step 46. Additionally, step 46 performs all of the functions of assignment A1 as described previously with respect to step 34 in FIG. 3. Flow then proceeds to step 48.

If the test T7 in step 44 is answered in the negative, flow proceeds directly from step 44 to step 48 to check for test T8. At step 48 test T8 is executed to check if the echo canceller 12 is synthesizing more echo than the desired signal energy P_s. More particularly, test T8 checks to see if the echo canceller 12 is synthesizing more echo than the desired signal energy is measured by the error signal energy P_e_ec_pre is higher than the desired signal energy P_s by at least a predetermined threshold (typically 3 dB). Test T8, if true, indicates the possibility that transient divergence of the echo canceller is occurring as indicated by high error signal energy in relation to the energy of the desired signal. Accordingly, if test T8 can be answered in the affirmative, the echo canceller 12 is instructed to set the center clipper flag cclip to an ON state as shown in step 50. Additionally, step 50, which executes assignment A4, the previous error average energy P_e_echo is set equal to the present error average energy P_e_ec_pre increments the counter clip_pre-cnt by 1 and a counter clip_pre_cnt is set to 5. The counter clip_pre_cnt is a count that captures the transient nature of occurrences where more echo power is synthesized than the desired signal s(n). A further characteristic of this count is that each time the condition occurs the counter is set to a value of 5, otherwise it is decremented. Another restriction placed on the count is that if the error signal e(n) is less than the desired signal s(n) by a predetermined threshold (typically 3 dB), this count is set to zero. Finally, after the execution of assignment A4 in step 50, flow proceeds to the NXT routine, which is used to determine whether the linear echo flag lin_echo is set to an ON or OFF state. This routine will be described later in connection with FIGS. 6–9.

Figure 5:
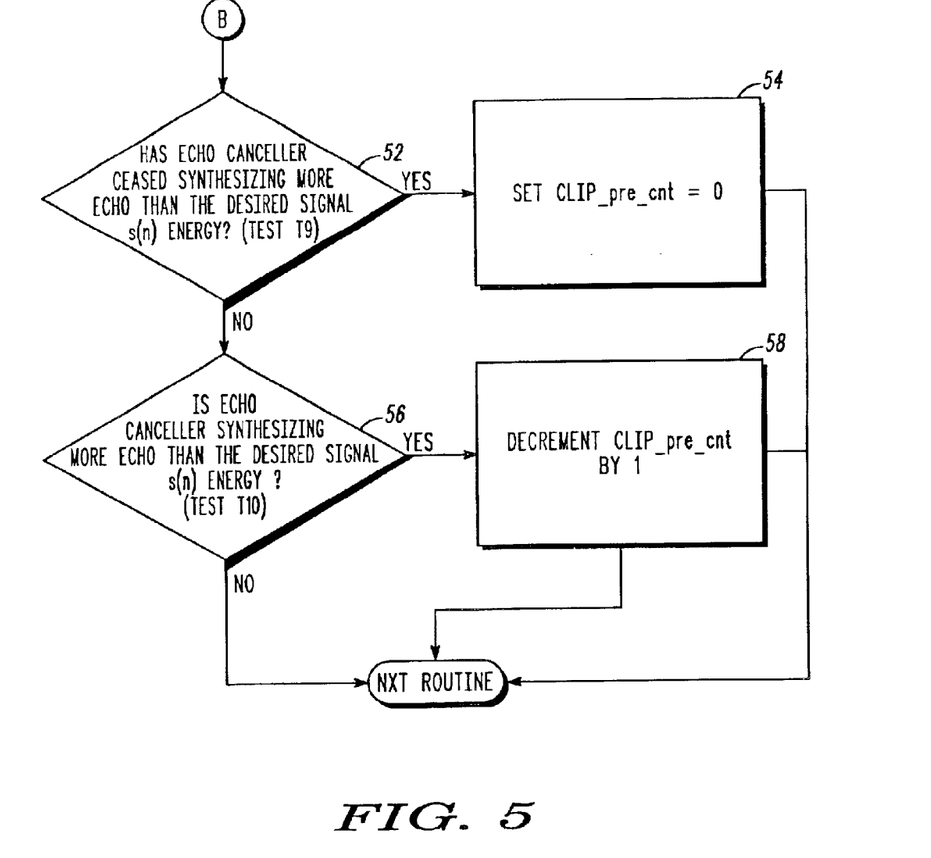

Alternatively, if test T8 is answered in the negative at step 48, flow proceeds to step 52, shown in FIG. 5, for the execution of test T9. Test T9 is a check to determine if the echo canceller 12 has exited the transient case of synthesizing more echo than the desired signal. Specifically, test T9 checks whether the error signal energy P_e_ec_pre is less than the desired signal energy P_s by a predetermined threshold (typically 3 dB). It is noted that test T9 is simply the converse of test T8, which was executed previously. If test T9 is true, then the counter clip_pre_cnt is set to zero at step 54 in accordance with the prescribed characteristics of this counter, which were described above. Flow then proceeds to the NXT routine, which will be described in connection with FIGS. 6–9.

Alternatively, if at step 52 test T9 is answered in the negative, flow proceeds to step 56 for the execution of test T1. The purpose of test T10 is to determine whether the echo canceller 12 is in a transient phase of synthesizing more echo than the desired signal energy. In order to determine if this is the case, the counter clip_pre_cnt is polled to determine whether or not it is greater than zero. If this condition is true, flow proceeds to step 58 where the counter clip_pre-cnt is decremented by 1. Hence, once a transient condition occurs (i.e., a transition from linear to non-linear or vice versa), the echo canceller 12 is prohibited from setting the center clipper flag cclip for more than 20 milliseconds (i.e., clip_pre_cnt=5=(5×4 millisecond sampling window periods)). Once the flag clip_pre_cnt is decremented by 1 in step 58, flow proceeds to the NXT routine to be discussed in connection with FIGS. 6–9. Alternatively, if at step 56 test T10 is not true, flow proceeds directly to the NXT routine The NXT routine is illustrated in FIGS. 6–9 and begins with step 60 shown in FIG. 6 after the NXT routine has been called. Step 60 executes the test T11 wherein a check is performed to determine whether the echo canceller is still in a divergence mode as indicated by the counter clip_pre_cnt being greater than zero. Additionally, test T11 checks if the desired signal energy P_s is less than the reference signal energy P_x by a predetermined threshold (typically 6 dB). If the conditions of test T11 are answered in the affirmative, the flow proceeds to step 62 where the echo canceller 12 is instructed to set the center clipper flag cclip to the ON state. Additionally the previous error average energy P_e_echo is set equal to the present error average energy P_e_ec_pre and the counter clip_ec_cnt is incremented by 1 (Note: this is the same assignment A1 as performed in previous steps 34 and 46). Flow then proceeds from step 62 to step 64 for execution of test T12. Alternatively, if the answer to the queries of test T11 is NO, flow proceeds directly from step 60 to step 64.

Figure 6:
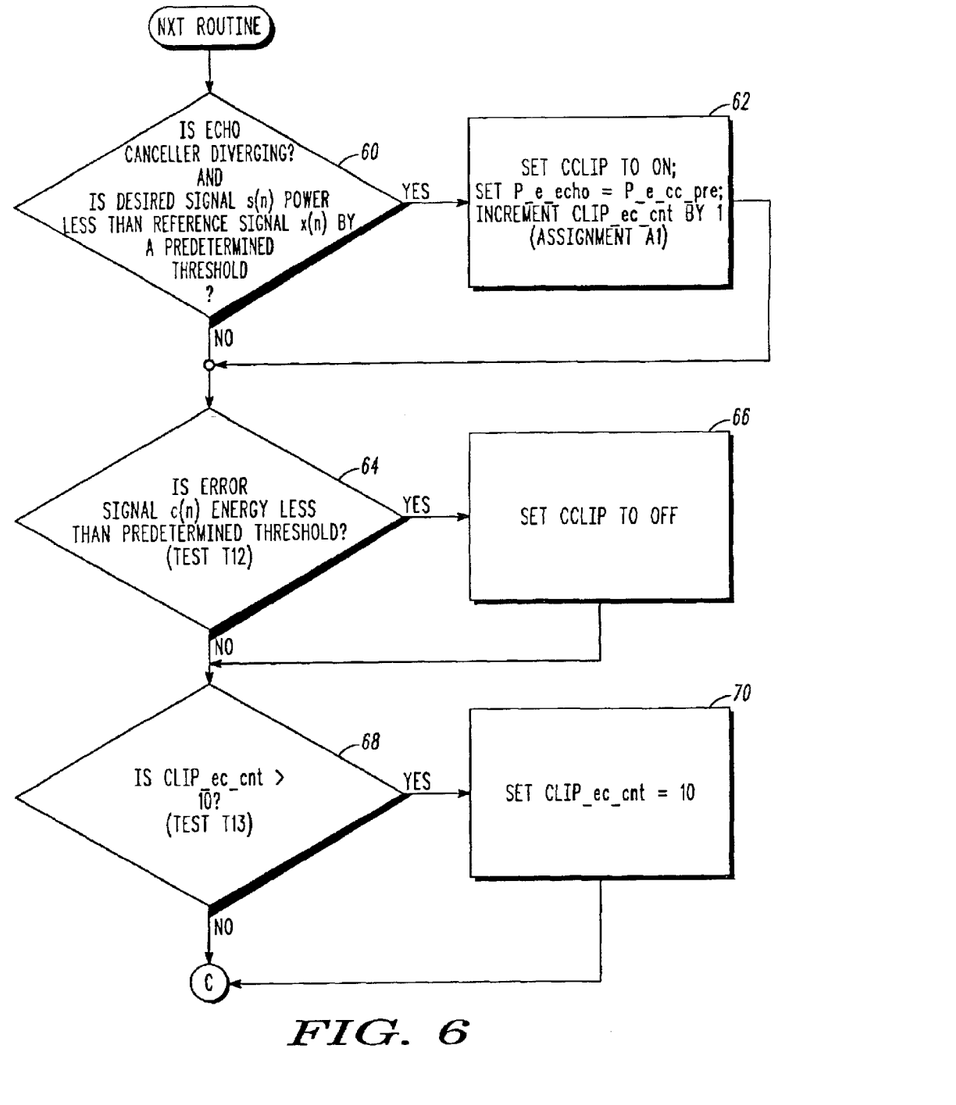

At step 64 test T12 is executed to determine whether or not the error signal energy is very weak. This is determined by checking whether the error signal energy P_e_ec_pre is less than −50 dBmO, for example, which would indicate a very low energy level. If test T12 is answered in the affirmative, flow proceeds to step 66 where the echo canceller 12 is directed to set the center clipper flag cclip to the OFF state and flow then proceeds to step 68. Alternatively, if the condition of test T12 is not met, as determined at step 64, flow proceeds directly to step 68 for execution of test T13.

In step 68 test T13 checks to determine whether the counter clip_ec_cnt, which indicates the number of times clipping has been initiated, is greater than 10. If this condition is met, flow proceeds to step 70 where the counter clip_ec_cnt is saturated to a value of 10 in order to ensure fast reaction time (i.e., limiting the reaction time to 40 milliseconds). After steps 68 or 70 the flow proceeds to step 72, shown in FIG. 7, for the execution of test T14.

Figure 7:
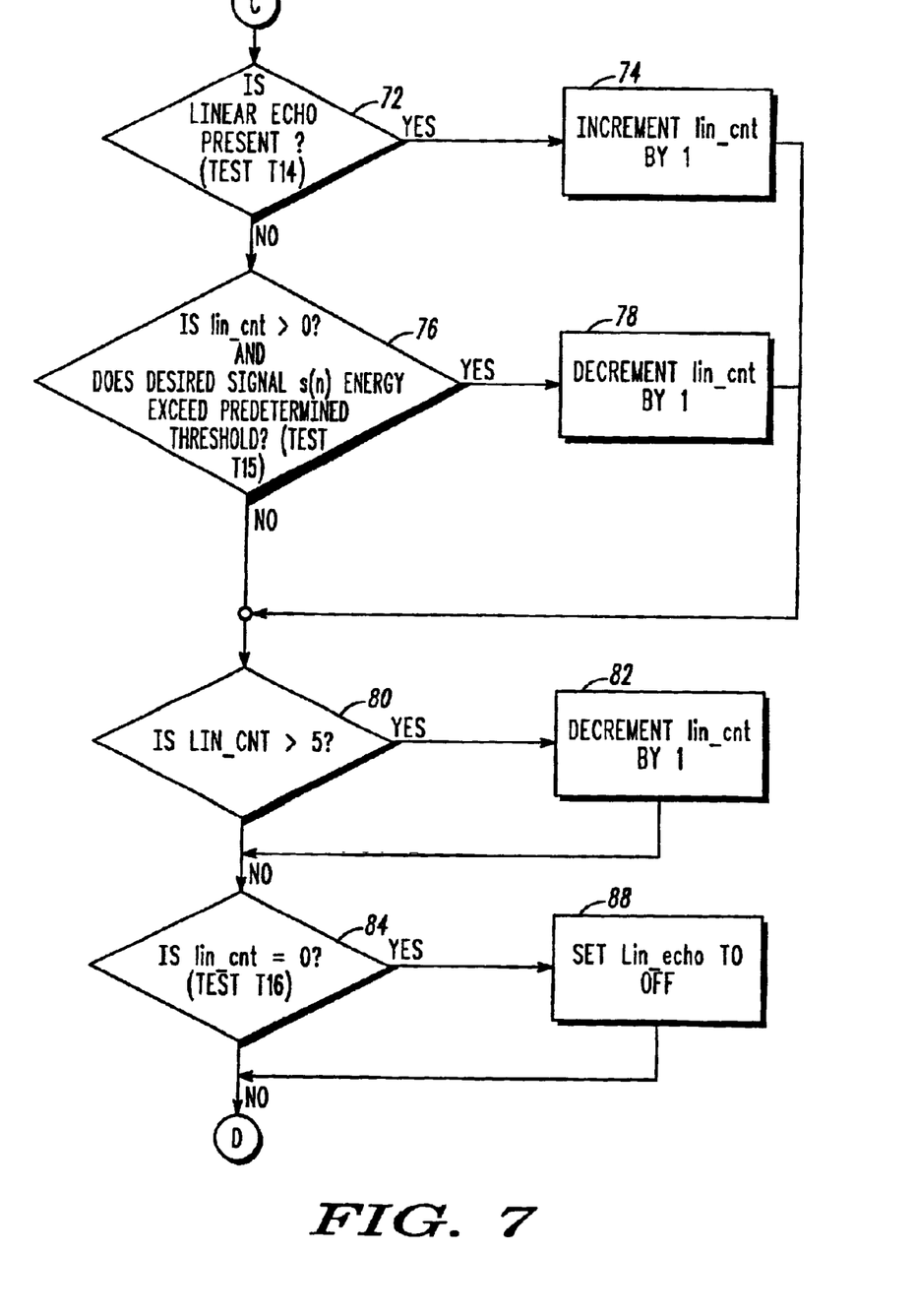

Test T14 checks for the presence of linear echo as indicated by the degree of cancellation measured by the desired signal energy P_s being greater than −45 dBmO and the error signal energy P_e_ec_pre being less than the desired signal energy P_s by a specific threshold (typically 10 db). If test T14 can be answered in the affirmative, flow proceeds to step 74 where the counter lin_cnt is incremented by 1. This count lin_cnt provides an indication of the presence of linear echo as measured by the error signal energy being below the desired signal energy by the specified threshold (e.g., 10 db). As will be described later, this count is saturated to a value of 5 to ensure fast reaction time to non-linearity. After the execution of step 74, the flow proceeds to step 80. Alternatively, at step 72, if the query is answered in the negative, flow proceeds to step 76 for the execution of test T15.

Test T15 in step 76 is used to check whether the count lin_cnt is greater than 0 and there is a concurrent presence of strong desired signal energy P_s as measured by the desired signal energy P_s exceeding a prescribed threshold (typically −35 dBmO). If this condition is true, the flow proceeds to step 78 where the counter lin_cnt is decremented by a value of 1. Flow then proceeds to step 80.

Alternatively, if the conditions of test T15 in step 76 are not met, flow proceeds directly to step 80. At step 80, the counter lin_cnt is checked to see if its value is greater than 5. If this condition is true, the counter lin_cnt is saturated to a value of 5 and the flag lin_echo is set to an ON state as indicated in step 82. After step 82 has been performed, flow proceeds to step 84. If the condition at step 80 is not true, flow proceeds directly to step 84.

At step 84 test T16 is executed. This test checks to determine if the counter lin_cnt has a value of 0. Typically this test will be executed at a predetermined interval, such as every one second. If the condition of test T16 is met, this indicates that non-linear echo is present and the flag lin_echo is set to an OFF state as shown in step 88. After step 88 has been performed flow proceeds to step 90, shown in FIG. 8. If, at step 84, the condition is not true, flow proceeds directly to step 90.

Figure 8:
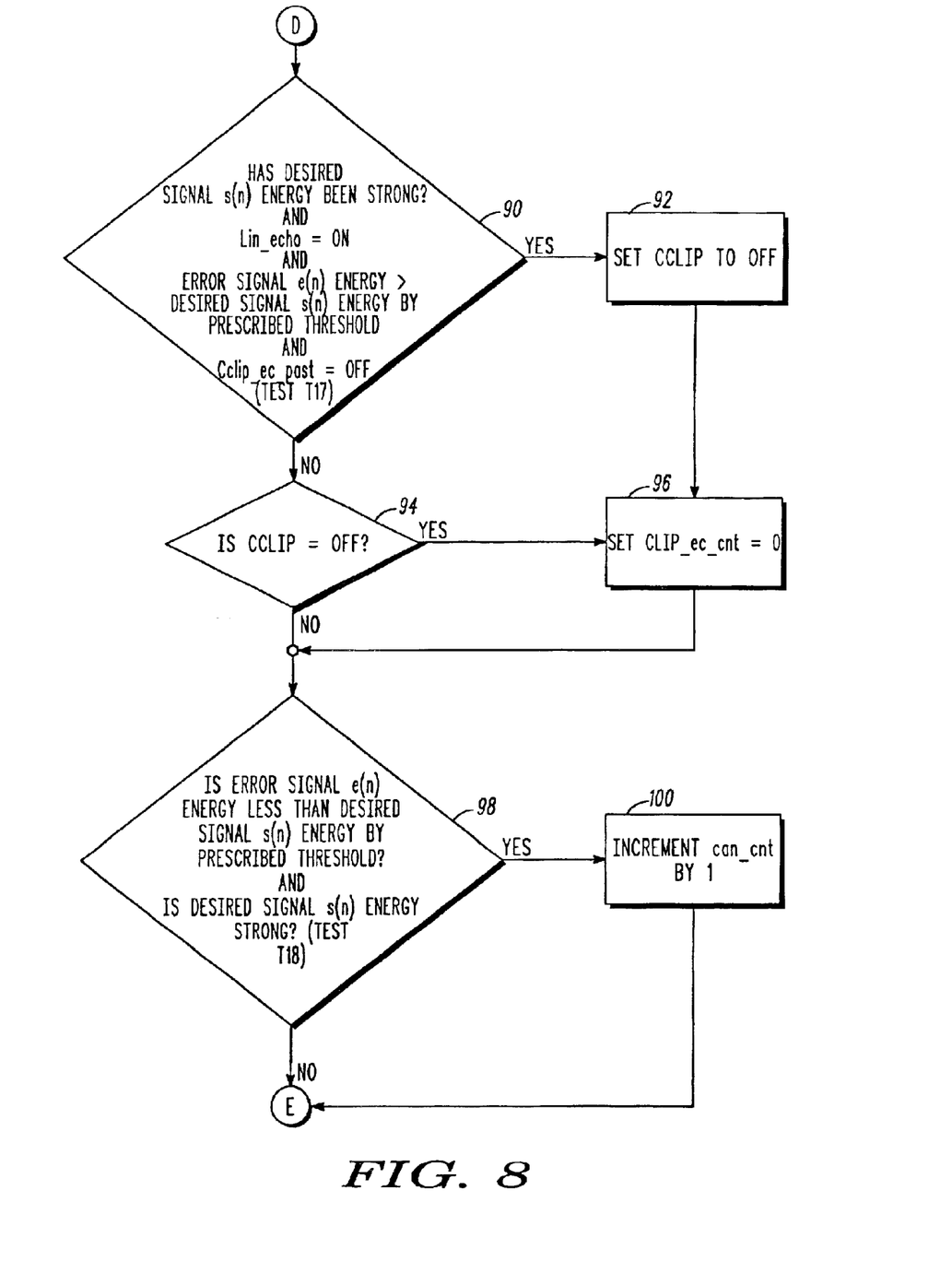

At step 90 in FIG. 8 test T17 is executed to determine if a lack of sufficient cancellation while in the linear echo mode does not warrant clipping given that the echo canceller 12 was not previously clipping. Specifically, test T17 checks if the desired signal energy P_s has been strong as measured by the desired energy exceeding a prescribed threshold (typically −35 dBmO) for a specified period of time (e.g., the past 16 milliseconds). Additionally, for test T17 to be True, the flag LIN_echo must be set to ON, indicating a linear condition. Furthermore, test T17 requires that the error signal energy P_e_ec_pre is greater than the desired signal energy P_s by prescribed threshold (typically −5 db). Finally, test T17 requires for a True state that the previous state of the center clipper flag clip was in an OFF state as indicated by the flag clip_ec_past. If all of the conditions of test T17 are met, indicating a true condition, flow proceeds to step 92 where the center clipper flag cclip is set to an OFF state. After the center clipper flag is turned OFF, flow proceeds to step 96 where the counter clip_ec_cnt is reset to zero. Flow then proceeds from step 96 directly to step 98.

If at step 90, one of the conditions of T17 is not met, indicating a False state, flow proceeds to step 94 where a check is performed to determine if the center clipper flag cclip is set to an OFF state. If the center clipper flag is in an OFF state flow is directed to step 96 for reset of the counter clip_ec_cnt to a 0 value. If the center clipper flag is in an ON state as determined at step 94 flow proceeds directly to step 98 for execution of test T18.

Test T18 is a test to determine if the echo canceller 12 is experiencing good cancellation. In order to determine whether the echo canceller has good cancellation, test T18 determines if the error signal energy P_e_ec_pre is less than the desired signal energy P_s by a prescribed threshold (typically set at 13 db) and that the desired signal energy P_s is strong (typically higher than −38 dBmO). If test T18 is True, this is an indication that the echo canceller 12 is experiencing good cancellation and flow proceeds to step 100 for increase of the cancellation counter can_cnt. The counter can_cnt is used to indicate whether the echo canceller is achieving good cancellation. In order to protect adaptive filter coefficients from possible divergence due to non-linearities within the echo generating system 14, a method and system constructed in accordance with the teachings of the present invention allow adaptation to occur when the cancellation counter can_cnt has a 0 value. If the cancellation counter is a value other than 0, adaptation of the adaptive filter is halted. In other words, if the echo canceller has arrived at a trusted coefficient state as reflected by the degree of cancellation, further adaptation of the adaptive filter may lead to an unnecessary departure from the trusted coefficient state (i.e., divergence).

Figure 9:
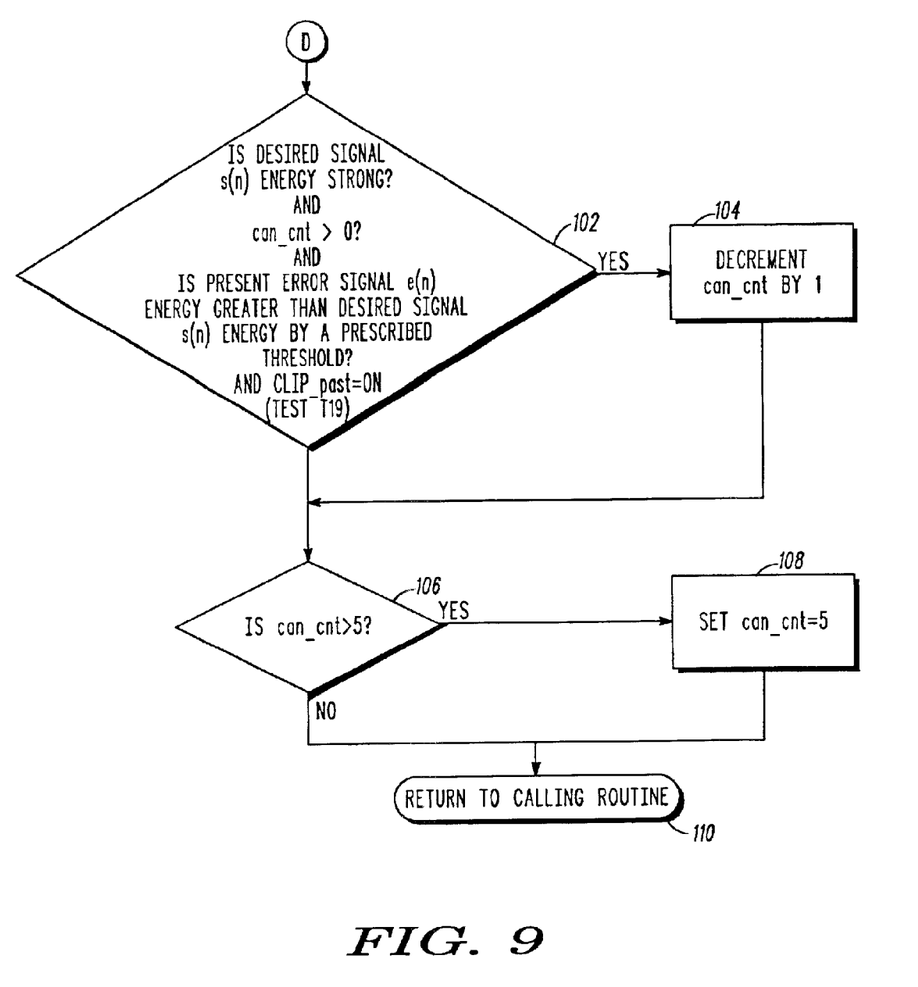

After step 100, or if test T18 in step 98 is False, flow proceeds to step 102 shown in FIG. 9 for execution of test T19. Test T19 is used to check whether the echo canceller may be arriving at a new state of the echo generating system 14 as indicated by poor cancellation. Specifically, test T19 checks whether the desired signal energy P_s is strong (typically higher than −38 db) and that the cancellation counter can_cnt is greater than 0. Additionally, test T19 checks to see whether the present error signal energy P_e_ec_pre is greater than the desired signal energy P_s by a prescribed threshold (typically −2 db). Finally, test T19 checks to see if the echo canceller 12 was previously clipping by determining whether the flag clip_ec_past is in the ON state. If all of these conditions are true, this is an indication that the echo generating system may be arriving at a new state. Accordingly, flow proceeds to step 104 where the cancellation counter can_cnt is decremented by one (1). Flow then proceeds from step 104 to step 106 where a determination is made whether the cancellation counter can_cnt is greater than a value of 5. Alternatively, if at step 102 any of the conditions of T19 is answered in the negative flow proceeds directly to step 106.

If the condition of step 106 is True, flow proceeds to step 108 where the cancellation counter can_cnt is saturated to a value of 5 for fast reaction time. Flow then proceeds to step 110 which is a return to the calling routine from the main flow diagram illustrated in FIGS. 3–5. Alternatively, if the condition of step 106 is False, flow proceeds directly to the return to the calling routine as indicated at step 110.

Although certain apparatuses may be constructed and methods may be performed in accordance with the teachings herein, the scope of coverage of this patent is not limited thereto. On the contrary, this patent covers all embodiments of the teachings fairly falling within the scope of the appended claims, either literally or under the doctrine of equivalents.

What is claimed is:

1. A method for controlling an echo canceling system within a communication system, the method comprising the steps of:
   detecting an occurrence of at least one of a transition from non-linear echo path to linear echo path and a transition from linear echo path to non-linear echo path;
   distinguishing a type of non-linear echo path between that based upon the presence or absence of near-end communication and a system confined source when occurrence of non-linear echo path is detected;
   halting a standard adaptation routine used to control at least one portion of the echo canceling system when occurrence of non-linear echo path is detected; and
   initiating a prescribed logic routine to control the echo canceling system in place of the standard adaptation routine during the occurrence of non-linear echo path and based upon the type of non-linearity.

2. The method of claim 1, wherein the step of detecting an occurrence of at least one of a transition from non-linear echo path to linear echo path and a transition from linear echo path to non-linear echo path comprises performing at least one of a plurality of tests.

3. The method of claim 2, wherein a test of the plurality of tests comprises one of the group of tests comprising: detecting a presence of non-linear echo; checking a sufficiency of echo cancellation; determining a present error energy relative to a previous error energy; determining a strength of a desired signal energy; checking for a presence of weak echo; checking for echo canceller divergence; checking for a presence of strong echo; determining an amount of synthesized echo relative to a desired signal energy; and determining a transient state wherein synthesized echo exceeds a desired energy level.

4. The method of claim 3, wherein the test of detecting a presence of non-linear echo comprises testing at least one of: recent center clipping activity; error signal energy relative to a threshold and error signal energy relative to a desired signal energy.

5. The method of claim 3, wherein the test of checking a sufficiency of echo cancellation comprises testing at least one of error signal energy relative to a desired signal energy and a desired signal energy relative to a threshold.

6. The method of claim 3, wherein the test of checking for checking for a presence of weak echo and for echo canceller divergence comprises at least one of determining a magnitude of a square of a peak adaptive filter coefficient relative to a threshold; determining an error energy relative to a desired signal energy; and determining whether a desired signal energy is greater than a reference signal energy by a predetermined amount.

7. The method of claim 3, wherein the test of checking for the presence of strong echo comprises determining a reference signal energy relative to a first threshold and determining a desired signal energy relative to a second threshold.

8. The method of claim 3, wherein the test of determining an amount of synthesized echo exceeds relative to a desired signal energy comprises determining whether an error energy relative to a desired signal energy.

9. The method of claim 3, wherein the test of determining a transient state wherein synthesized echo exceeds a desired energy level comprises at least one of: determining a transition either into or from the transient state; determining a transition either into or from a transient state by checking whether an error signal energy relative to a desired signal energy; and checking a center clipping counter value.

10. The method of claim 1, the prescribed logic routine comprises at least one step of the group of steps comprising: determining a divergence state of the echo canceller; determining a desired signal energy relative to a reference signal energy; checking an error signal energy relative to a predetermined threshold; determining a strength of an error signal; checking a center clipper counter value; determining a presence of linear echo; checking a linear echo counter; determining a desired energy level relative a threshold; determining a sufficiency of echo cancellation in the presence of linear echo; determining a quality of echo cancellation and determining an echo canceller state.

11. The method of claim 10, wherein the step of checking a center clipper counter value comprises determining a center clipper counter is saturated.

12. The method of claim 10, wherein the step of determining a sufficiency of echo cancellation in the presence of linear echo comprises checking a desired signal energy relative to a threshold for a period of time.

13. The method of claim 10, wherein the step of determining the quality of echo cancellation comprises determining an error signal energy relative to a desired signal energy and determining the desired signal energy relative to a threshold.

14. The method of claim 10, wherein the step of determining a state of the echo canceller comprises at least one of the steps of: determining a desired signal energy level relative to a predetermined value, checking a value of a cancellation counter, checking whether a present error signal energy is greater than the desired signal energy level by a predetermined threshold and checking a state of a center clipping flag.

15. The method of claim 1, wherein the prescribed logic routine comprises at least one of the steps of: setting a center clipper state to ON, setting a previous error average energy equal to a present error average energy; incrementing a center clip counter value; setting a center clipper state to OFF; resetting a center clipping counter; setting a previous error average energy equal to a present error average energy; incrementing a center clip counter value; setting a transient counter value; decrementing a transient counter value; and saturating a center clipping counter.

16. An apparatus for echo canceling within a communication system wherein an echo generating system exists within the communication system introducing echo into a reference signal path, the apparatus comprising:

an echo canceller coupled to a desired signal path, the desired signal path including a desired signal and an echo signal generated by the echo generating system, the echo canceller including a first adaptation routine and a second adaptation routine an output signal for providing an output signal for canceling the echo signal from the desired signal path;

wherein the echo canceller is operable to detect an occurrence of at least one of a transition from non-linear echo path to linear echo path and a transition from linear echo path to non-linear echo path; to distinguish a type of non-linearity between that based upon the presence or absence of near end communication and a system confined source; and to halt operation of the first adaptation routine and to initiate operation of the second adaptation routine based upon the occurrence of non-linear echo path and the type of non-linearity.

17. The apparatus of claim 16, wherein the echo canceller comprises a plurality of tests, wherein the plurality of tests are selectively adapted to indicate a transition from linear echo path to non-linear echo path.

18. The apparatus of claim 17, wherein the plurality of tests comprise: detecting a presence of non-linear echo; checking a sufficiency of echo cancellation; determining a present error energy relative to a previous error energy; determining a strength of a desired signal energy; checking for a presence of weak echo; checking for echo canceller divergence; checking for a presence of strong echo; determining an amount of synthesized echo relative to a desired signal energy; and determining a transient state wherein synthesized echo exceeds a desired energy level.

19. The apparatus of claim 16, wherein the echo canceller comprises a comfort noise generator to provide a comfort noise signal, and wherein the output signal comprises the comfort noise signal.

20. The apparatus of claim 16, wherein the echo canceller comprises a synthetic echo generating system to provide a synthetic echo signal, and wherein output signal comprise the synthetic echo signal.

\* \* \* \* \*